US012067937B2

(12) United States Patent
Cao et al.

(10) Patent No.: US 12,067,937 B2
(45) Date of Patent: Aug. 20, 2024

(54) DISPLAY PANEL AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventors: Weiran Cao, Shenzhen (CN); Kuo Gao, Shenzhen (CN); Baixiang Han, Shenzhen (CN)

( * ) Notice: Subject to any disclaimer, the term of this patent is extended or adjusted under 35 U.S.C. 154(b) by 0 days.

(21) Appl. No.: 17/620,700

(22) PCT Filed: Dec. 16, 2021

(86) PCT No.: PCT/CN2021/138627
§ 371 (c)(1),
(2) Date: Jun. 15, 2023

(87) PCT Pub. No.: WO2023/102993
PCT Pub. Date: Jun. 15, 2023

(65) Prior Publication Data

US 2024/0029649 A1 Jan. 25, 2024

(30) Foreign Application Priority Data

Dec. 8, 2021 (CN) ......................... 202111489721.X

(51) Int. Cl.

*G09G 5/00* (2006.01)
*G09G 3/20* (2006.01)
*G09G 3/3233* (2016.01)

(52) U.S. Cl.
CPC ......... *G09G 3/3233* (2013.01); *G09G 3/2007* (2013.01); *G09G 2300/0852* (2013.01)

(58) Field of Classification Search
CPC ............... G09G 3/2007; G09G 3/3233; G09G 2300/0852
See application file for complete search history.

(56) References Cited

U.S. PATENT DOCUMENTS 8,395,567 B2 * 3/2013 Matsui ................. G09G 3/3233 345/76
8,624,880 B2 * 1/2014 Ishiguro ............... G09G 3/3233 345/204
8,988,329 B2 * 3/2015 Yoon .................... G09G 3/3233 345/77
9,117,399 B2 * 8/2015 Ishiguro ............... G09G 3/3233
(Continued)

FOREIGN PATENT DOCUMENTS

CN 103280183 A 9/2013
CN 203300188 U * 11/2013
(Continued)

*Primary Examiner* — Joe H Cheng

(57) ABSTRACT

A display panel is disclosed. The display panel includes a pixel driving circuit. The pixel driving circuit includes: a first transistor, wherein the first transistor and a light-emitting device are series-connected between a first power line and a second power line; and a second transistor, wherein the second transistor and the light-emitting device are series-connected between the first power line and the second power line. A width-to-length ratio of the first transistor is greater than a width-to-length ratio of the second transistor. A display device is further disclosed.

16 Claims, 3 Drawing Sheets

(56) References Cited

U.S. PATENT DOCUMENTS

| | | | | | |
|---|---|---|---|---|---|
| 10,482,823 | B2 * | 11/2019 | Lee | G09G 3/3266 | |
| 11,011,112 | B2 * | 5/2021 | Li | G09G 3/325 | |
| 11,663,961 | B2 * | 5/2023 | Liu | G09G 3/32 | 345/55 |
| 11,847,965 | B2 * | 12/2023 | Xiang | G09G 3/3241 | |
| 2011/0012876 | A1 * | 1/2011 | Yamashita | G09G 3/30 | 345/204 |
| 2017/0039934 | A1 * | 2/2017 | Ma | G09G 3/3233 | |

FOREIGN PATENT DOCUMENTS

| | | | | |
|---|---|---|---|---|
| CN | 203300188 | U | | 11/2013 |
| CN | 105513534 | A | | 4/2016 |
| CN | 110189692 | A | | 8/2019 |
| CN | 110299107 | A | | 10/2019 |
| CN | 110491338 | A | | 11/2019 |
| CN | 111429834 | A | | 7/2020 |
| CN | 111477166 | A | | 7/2020 |
| CN | 113327541 | A | | 8/2021 |
| CN | 113725274 | A | * | 11/2021 |
| WO | 2013065595 | A1 | | 5/2013 |
| WO | 2021064894 | A1 | | 4/2021 |

* cited by examiner

DISPLAY PANEL AND DISPLAY DEVICE

CROSS-REFERENCE TO RELATED APPLICATIONS

This application is the National Stage of PCT/CN2021/138627 filed on Dec. 16, 2021, which claims priority under 35 U.S.C. § 119 of Chinese Application No. CN202111489721.X filed on Dec. 8, 2021, the disclosure of which is incorporated by reference.

FIELD

The present disclosure relates to a field of display technologies, and more particularly, to a display panel and a display device.

BACKGROUND

Organic light-emitting diode (OLED) display panels have advantages such as wide color gamut, high contrast, and fast response time, and therefore have been continuously developed to be a mainstream high-end display. However, due to an issue of threshold voltage variation of oxide backplates, a series of compensation algorithms needs to be applied to OLED display panels. Chips need to output a voltage for display and a voltage for compensation, causing a heavy workload for the chips.

Conventional pixels are disposed in an entire display area. Sizes of driving thin-film transistors (TFTs) of sub-pixels emitted a same color of light are same. When devices display images at low brightness (low grayscale), a requirement current is low, and a data voltage outputted from chips is low as well. When a data voltage difference between two adjacent grayscales is less than physical limits of chips, a low grayscale level will be further reduced, deteriorating a display effect.

SUMMARY

Embodiments of the present disclosure provide a display panel and a display device, which can improve a display effect of display panels at low grayscale levels.

To solve the above issue, technical solutions provided by the present disclosure are described below.

An embodiment of the present disclosure provides a display panel, comprising a pixel driving circuit and a light-emitting device, wherein the pixel driving circuit comprises: a first transistor, wherein the first transistor and the light-emitting device are series-connected between a first power line and a second power line, and the first transistor comprises a first electrode electrically connected to the first power line, a second electrode electrically connected to the second power line, and a gate electrically connected to a data line; and a second transistor, wherein the second transistor and the light-emitting device are series-connected between the first power line and the second power line, and the second transistor comprises a first electrode electrically connected to the first power line, a second electrode electrically connected to the second power line, and a gate electrically connected to the data line; wherein a width-to-length ratio of the first transistor is greater than a width-to-length ratio of the second transistor.

In some embodiments, the light-emitting device comprises a first sub-light-emitting device and a second sub-light-emitting device, the second electrode of the first transistor is electrically connected to the first sub-light-emitting device, and the second electrode of the second transistor is electrically connected to the second sub-light-emitting device.

In some embodiments, the pixel driving circuit comprises a third transistor, a fourth transistor, a first capacitor, and a second capacitor, a first electrode of the third transistor is electrically connected to the data line, a second electrode of the third transistor is electrically connected to the gate of the first transistor, a gate of the third transistor is electrically connected to a scan line, a first electrode plate of the first capacitor is electrically connected to the gate of the first transistor, a second electrode plate of the first capacitor is connected to the second electrode of the first transistor, a first electrode of the fourth transistor is electrically connected to the data line, a second electrode of the fourth transistor is electrically connected to the gate of the second transistor, a gate of the fourth transistor is electrically connected to the scan line, a first electrode plate of the second capacitor is electrically connected to the gate of the second transistor, and a second electrode plate of the second capacitor is connected to the second electrode of the second transistor.

In some embodiments, the data line comprises a first sub-data line and a second sub-data line, the first electrode of the third transistor is electrically connected to the first sub-data line, and the first electrode of the fourth transistor is electrically connected to the second sub-data line.

In some embodiments, the pixel driving circuit comprises a fifth transistor and a sixth transistor, a first electrode of the fifth transistor is electrically connected to the second electrode of the first transistor and the second electrode plate of the first capacitor, a second electrode of the fifth transistor is electrically connected to a third power line, a gate of the fifth transistor is electrically connected to the scan line, a first electrode of the sixth transistor is electrically connected to the second electrode of the second transistor and the second electrode plate of the second capacitor, a second electrode of the sixth transistor is electrically connected to the third power line, and a gate of the sixth transistor is electrically connected to the scan line.

In some embodiments, when the pixel driving circuit is in a high grayscale display state, the third transistor and the fourth transistor are opened in response to a scan signal of the scan line, the fifth transistor and the sixth transistor are closed in response to the scan signal of the scan line, the first transistor is opened in response to a first data voltage of the first sub-data line, the first sub-light-emitting device emits light, the second transistor is closed in response to a second data voltage of the second sub-data line, and the second sub-light-emitting device does not emit light; and when the pixel driving circuit is in a low grayscale display state, the third transistor and the fourth transistor are opened in response to the scan signal of the scan line, the fifth transistor and the sixth transistor are closed in response to the scan signal of the scan line, the first transistor is closed in response to the first data voltage of the first sub-data line, the first sub-light-emitting device does not emit light, the second transistor is opened in response to the second data voltage of the second sub-data line, and the second sub-light-emitting device emits light.

In some embodiments, light emitted from the first sub-light-emitting device and light emitted from the second sub-light-emitting device have a same color.

In some embodiments, a ratio of a width-to-length ratio of the first transistor to a width-to-length ratio of the second transistor is greater than 1 and less than 3.

An embodiment of the present disclosure further provides a display panel, comprising a plurality of sub-pixels, wherein each of the sub-pixels comprises a light-emitting device and a pixel driving circuit, and the pixel driving circuit comprises: a first transistor, wherein the first transistor and the light-emitting device are series-connected between a first power line and a second power line, and the first transistor comprises a first electrode electrically connected to the first power line, and a second electrode electrically connected to the second power line; and a second transistor, wherein the second transistor and the light-emitting device are series-connected between the first power line and the second power line, and the second transistor comprises a first electrode electrically connected to the first power line, and a second electrode electrically connected to the second power line; wherein driving performance of the first transistor is greater than driving performance of the second transistor; when the sub-pixels are in a high grayscale display state, the first transistor is opened to drive the light-emitting device to emit light; and when the sub-pixels are in a low grayscale display state, the second transistor is opened to drive the light-emitting device to emit light.

In some embodiments, a width-to-length ratio of the first transistor is greater than a width-to-length ratio of the second transistor.

In some embodiments, a ratio of the width-to-length ratio of the first transistor to the width-to-length ratio of the second transistor is greater than 1 and less than 3.

In some embodiments, carrier mobility of the first transistor is greater than carrier mobility of the second transistor; or capacitance of a gate oxide layer per unit area of the first transistor is greater than capacitance of a gate oxide layer per unit area of the second transistor; or a threshold voltage of the first transistor is less than a threshold voltage of the second transistor.

An embodiment of the present disclosure further provides a display device, comprising a display panel, wherein the display panel comprises a pixel driving circuit and a light-emitting device, and the pixel driving circuit comprises:

- a first transistor, wherein the first transistor and the light-emitting device are series-connected between a first power line and a second power line, and the first transistor comprises a first electrode electrically connected to the first power line, a second electrode electrically connected to the second power line, and a gate electrically connected to a data line; and
- a second transistor, wherein the second transistor and the light-emitting device are series-connected between the first power line and the second power line, and the second transistor comprises a first electrode electrically connected to the first power line, a second electrode electrically connected to the second power line, and a gate electrically connected to the data line;
- wherein a width-to-length ratio of the first transistor is greater than a width-to-length ratio of the second transistor.

In some embodiments, the light-emitting device comprises a first sub-light-emitting device and a second sub-light-emitting device, the second electrode of the first transistor is electrically connected to the first sub-light-emitting device, and the second electrode of the second transistor is electrically connected to the second sub-light-emitting device.

In some embodiments, the pixel driving circuit comprises a third transistor, a fourth transistor, a first capacitor, and a second capacitor, a first electrode of the third transistor is electrically connected to the data line, a second electrode of the third transistor is electrically connected to the gate of the first transistor, a gate of the third transistor is electrically connected to a scan line, a first electrode plate of the first capacitor is electrically connected to the gate of the first transistor, a second electrode plate of the first capacitor is connected to the second electrode of the first transistor, a first electrode of the fourth transistor is electrically connected to the data line, a second electrode of the fourth transistor is electrically connected to the gate of the second transistor, a gate of the fourth transistor is electrically connected to the scan line, a first electrode plate of the second capacitor is electrically connected to the gate of the second transistor, and a second electrode plate of the second capacitor is connected to the second electrode of the second transistor.

In some embodiments, the data line comprises a first sub-data line and a second sub-data line, the first electrode of the third transistor is electrically connected to the first sub-data line, and the first electrode of the fourth transistor is electrically connected to the second sub-data line.

In some embodiments, the pixel driving circuit comprises a fifth transistor and a sixth transistor, a first electrode of the fifth transistor is electrically connected to the second electrode of the first transistor and the second electrode plate of the first capacitor, a second electrode of the fifth transistor is electrically connected to a third power line, a gate of the fifth transistor is electrically connected to the scan line, a first electrode of the sixth transistor is electrically connected to the second electrode of the second transistor and the second electrode plate of the second capacitor, a second electrode of the sixth transistor is electrically connected to the third power line, and a gate of the sixth transistor is electrically connected to the scan line.

In some embodiments, when the pixel driving circuit is in a high grayscale display state, the third transistor and the fourth transistor are opened in response to a scan signal of the scan line, the fifth transistor and the sixth transistor are closed in response to the scan signal of the scan line, the first transistor is opened in response to a first data voltage of the first sub-data line, the first sub-light-emitting device emits light, the second transistor is closed in response to a second data voltage of the second sub-data line, and the second sub-light-emitting device does not emit light; and when the pixel driving circuit is in a low grayscale display state, the third transistor and the fourth transistor are opened in response to the scan signal of the scan line, the fifth transistor and the sixth transistor are closed in response to the scan signal of the scan line, the first transistor is closed in response to the first data voltage of the first sub-data line, the first sub-light-emitting device does not emit light, the second transistor is opened in response to the second data voltage of the second sub-data line, and the second sub-light-emitting device emits light.

In some embodiments, light emitted from the first sub-light-emitting device and light emitted from the second sub-light-emitting device have a same color.

In some embodiments, a ratio of a width-to-length ratio of the first transistor to a width-to-length ratio of the second transistor is greater than 1 and less than 3.

Regarding the Beneficial Effects:

In a display panel and a display device provided by embodiments of the present disclosure, a width-to-length ratio of a first transistor is greater than a width-to-length ratio of a second transistor. Therefore, the first transistor has better driving performance compared with second transistor. In a high grayscale display state, the first transistor is opened to generate a greater current, thereby driving a light-emitting device to emit light. In a low grayscale display state, the second transistor is opened to generate a lower current, thereby driving the light-emitting device to emit light. Therefore, a capability of the display panel to separate grayscale levels is improved, and a display effect at low grayscale levels is enhanced.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION

Figure 1:
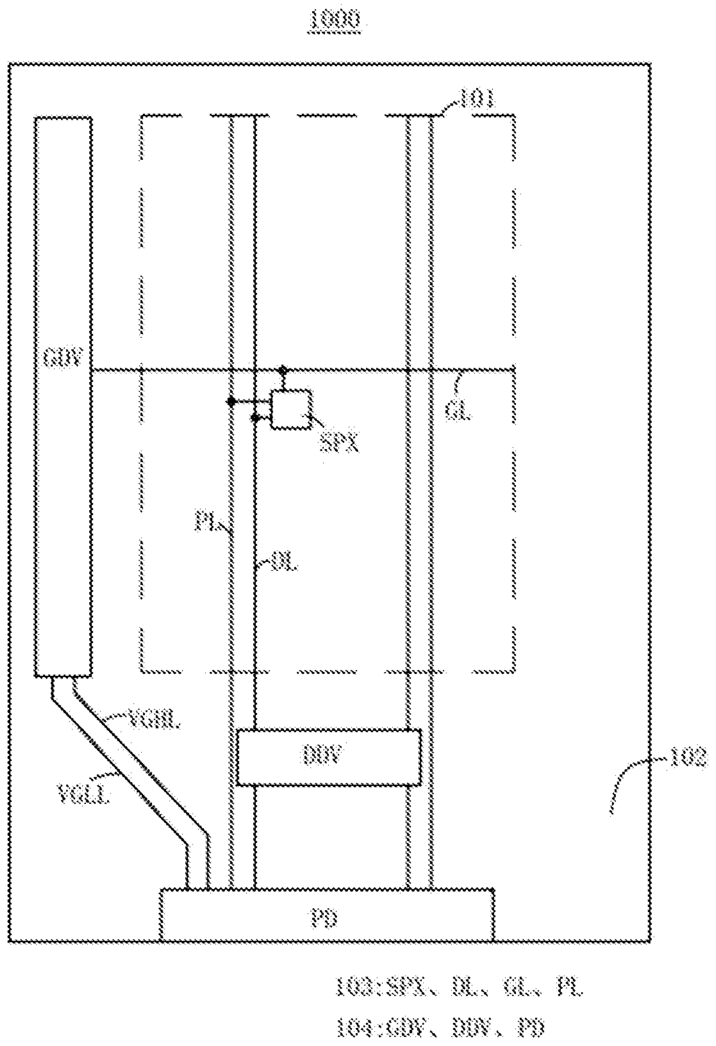
FIG. 1 is a structural schematic view showing a display panel provided by an embodiment of the present disclosure.

Hereinafter preferred embodiments of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure. Embodiments, which are based on the embodiments of the present disclosure, obtained by those skilled in the art without making any inventive efforts are within the scope of protection defined by the present disclosure. It should be noted that described embodiments are merely used to construct the present disclosure and are not intended to limit the present disclosure. In the present disclosure, unless further description is made, terms such as "top" and "bottom" usually refer to a top of a device and a bottom of a device in an actual process or working status, and specifically, to the orientation as shown in the drawings. Terms such as "inside" and "outside" are based on an outline of a device.

Please refer to FIG. 1, an embodiment of the present disclosure provides a display panel 1000 which may include a main panel part 103 disposed in a display area 101 and a panel driving part 104 disposed in a non-display area 102. The display panel 1000 may be an organic light-emitting diode (OLED) display panel.

The main panel part 103 may include a sub-pixel SPX, a data line DL, a gate line GL, a power line PL, an initialization management line (not shown), and an initialization power line (not shown). The above lines may be electrically connected to the sub-pixel SPX, thereby driving the sub-pixel SPX to emit light.

The data line DL may be electrically connected to a data driving device DDV and may extend along a first direction. The data line DL may be electrically connected to the sub-pixel SPX, thereby allowing the data line DL to transmit a data voltage from the data driving device DDV to the sub-pixel SPX.

The gate line GL may be electrically connected to a gate driving device GDV and may extend along a second direction crossing the first direction. The gate line GL may be electrically connected to the sub-pixel SPX, thereby allowing the gate line GL to transmit a scan signal from the gate driving device GDV to the sub-pixel SPX.

The power line PL may be electrically connected to a pad PD and may extend along the first direction parallel to the data line DL. The power line PL may be electrically connected to the sub-pixel SPX, thereby transmitting a high voltage from the pad PD to the sub-pixel SPX. The power line PL may be electrically connected to the sub-pixel SPX, thereby transmitting a low voltage from the pad PD to an electrode, such as a cathode, of an OLED.

The panel driving part 104 may include the gate driving device GDV, the data driving device DDV, and the pad PD. For example, the panel driving part 104 may include a timing controller which can control the gate driving device GDV and the data driving device DDV.

The gate driving device GDV may use a first voltage and a second voltage to generate a scan signal. The first voltage and the second voltage may be supplied by a first voltage line VGHL and a second voltage line VGLL, respectively. Therefore, the scan signal may include the first voltage configured to close a switch transistor and the second voltage configured to open the switch transistor. In addition, the scan signal may be transmitted to the sub-pixel SPX by the gate line GL.

The data driving device DDV may provide a data voltage to the sub-pixel SPX by the first voltage line VGHL.

The pad PD may provide the first voltage and the second voltage to the gate driving device GDV by the first voltage line VGHL and the second voltage line VGLL, respectively. Each of the first voltage and the second voltage may be a constant voltage having a predetermined voltage level. In the present embodiment, when the switch transistor is a p-channel metal-oxide semiconductor (PMOS) transistor, the first voltage configured to close the switch transistor may have a positive voltage level, and the second voltage configured to open the switch transistor may have a negative voltage level.

The first voltage line VGHL and the second voltage line VGLL may be disposed in the non-display area 102 of the display device 1000 and may extend along the first direction. The first voltage line VGHL and the second voltage line VGLL may be electrically connected to the pad PD and the gate driving device GDV, thereby transmitting the first voltage and the second voltage to the pad PD and the gate driving device GDV. Therefore, the gate driving device GDV may generate a scan signal.

In addition, the gate driving device GDV may be disposed on a left side of the display device 1000 as shown in FIG. 1, but the present embodiment is not limited thereto. For example, two gate driving devices may be respectively disposed on a left side and a right side. For example, the data driving device DDV and the pad PD may be disposed in the non-display area 102 of the display device 1000, but the present disclosure is not limited thereto. In the present embodiment, the data driving device DDV may be disposed on another flexible printed circuit board (PCB), and the pad PD may be electrically connected to another flexible PCB.

In some embodiments, the display panel 1000 includes multiple sub-pixels SPX, multiple data lines DL, and multiple power lines PL. The sub-pixels PX may be all of sub-pixels of the display panel 1000, or may also be part of the sub-pixels of the display panel 1000. The data lines DL may be all of data lines of the display panel 1000, or may also be part of the data lines of the display panel 1000. The power lines PL may be all of power lines of the display panel 1000, or may also be part of the power lines of the display panel 1000.

The data line DL may include a first sub-data line DL1*a* and a second sub-data line DL1*b*.

The power line PL includes a first power line VDD and a second power line VSS. An applied voltage of the first power line VDD is greater than an applied voltage of the second power line VSS.

Each of the sub-pixels SPX includes a light-emitting device and a pixel driving circuit. The light-emitting device is electrically connected to the pixel driving circuit, thereby driving the light-emitting device to emit light.

The light-emitting device includes a first light-emitting device D1 and a second light-emitting device D2. The first sub-light-emitting device D1 and the second sub-light-emitting device D2 may include an organic light-emitting material such as a red organic light-emitting material, a blue organic light-emitting material, or a green organic light-emitting material. A color of light emitted from the first sub-light-emitting device D1 is same as a color of light emitted from the second sub-light-emitting device D2.

The pixel driving circuit includes a first transistor T1, a second transistor T2, a third transistor T3, a fourth transistor T4, a first capacitor C1, and a second capacitor C2. The first transistor T1, the second transistor T2, the third transistor T3, and the fourth transistor T4 may be same or different. For example, they may be an amorphous silicon TFT, a single crystalline silicon TFT, a polysilicon TFT, an oxide TFT, or a field effect transistor. The first transistor T1, the second transistor T2, the third transistor T3, and the fourth transistor T4 may be same or different. For example, they may be a p-type transistor or an n-type transistor.

The first transistor T1 may be a driving transistor. The first transistor T1 and the first sub-light-emitting device D1 may be series-connected between the first power line VDD and the second power line VSS, thereby providing a driving current to the first sub-light-emitting device D1. The first transistor T1 includes a first electrode electrically connected to the first power line VDD, a second electrode electrically connected to the first sub-light-emitting device D1 by a first node N1, and a gate connected to the first sub-data line DL1*a*.

The second transistor T2 may be a driving transistor. The second transistor T2 and the second sub-light-emitting device D2 may be series-connected between the first power line VDD and the second power line VSS, thereby providing a driving current to the second sub-light-emitting device D2. The second transistor T2 includes a first electrode electrically connected to the first power line VDD, a second electrode electrically connected to the second sub-light-emitting device D2 by a first node N2, and a gate connected to the second sub-data line DL1*b*. A ratio of a width-to-length ratio of the first transistor T1 to a width-to-length ratio of the second transistor is greater than 1 and less than 3.

The third transistor T3 may be a switch transistor and is configured to transmit a data signal to the gate of the first transistor T1 in response to a scan signal. A first electrode of the third transistor T3 is electrically connected to the first sub-data line DL1*a*. A second electrode of the third transistor T3 is electrically connected to the gate of the first transistor T1 by a third node N3. A gate of the third transistor T3 is electrically connected to the scan line GL.

The fourth transistor T4 may be a switch transistor and is configured to transmit a data signal to the gate of the second transistor T2 in response to a scan signal. A first electrode of the fourth transistor T4 is electrically connected to the first sub-data line DL12. A second electrode of the fourth transistor T4 is electrically connected to the gate of the second transistor T2 by a fourth node N4. A gate of the fourth transistor T4 is electrically connected to the scan line GL. The first electrode of the transistors is one of a source or a drain, the second electrode of the transistors is one of a source or a drain and is different from the first electrode.

The first capacitor C1 is configured to storage a data signal of the first sub-data line DL1*a*. A first electrode plate of the first capacitor C1 is electrically connected to the first transistor T1 by the third node N3. A second electrode plate of the first capacitor C1 is connected to the second electrode of the first transistor T1 by the first node N1.

The second capacitor C2 is configured to storage a data signal of the second sub-data line DL1*b*. A first electrode plate of the second capacitor C2 is electrically connected to the gate of the second transistor T2 by the fourth node N4. A second electrode plate of the second capacitor C2 is connected to the second electrode of the second transistor T2 by the second node N2. When the display panel 1000 emits light, a current I flowing through the light-emitting device, and I=½·W/L·μ·C_ox·(Vgs−Vth)^2, wherein W/L is a width-to-length ratio of a channel of a driving transistor, u is a mobility of the driving transistor, C_ox is capacitance of a gate oxide layer per unit area of the driving transistor, Vgs is a source/drain voltage of the driving transistor, and Vth is a threshold voltage of the driving transistor. Since the width-to-length ratio of the first transistor T1 is greater than the width-to-length ratio of the second transistor T2, the first transistor T1 has better driving performance compared with the second transistor T2. Therefore, under same conditions, the first transistor T1 can generate a greater current compared with the second transistor T2. Au such, the first transistor T1 is more suitable for driving the light-emitting device to emit light in high grayscale levels, and the second transistor is more suitable for driving the light-emitting device to emit light in low grayscale levels. For example, when the display panel 1000 has 256 grayscale levels, high grayscale levels may denote grayscales greater than a 64th grayscale, and low grayscale levels may denote grayscales lower than or equal to the 64th grayscale.

When the sub-pixel SX is in a high grayscale display state, the first transistor T1 is opened. The first sub-data line DL1*a* provides a corresponding data voltage, thereby allowing the first transistor T1 to provide a greater driving current to drive the first sub-light-emitting device D1 to emit light. The second sub-data line DL1*b* may output a corresponding data voltage, thereby making the second sub-light-emitting device D2 not emit light. When the sub-pixel SPX is in a low grayscale display state, the second transistor T2 is opened. The second sub-data line DL1*b* provides a corresponding data voltage, thereby allowing the second transistor T2 to provide a lower driving current to drive the second sub-light-emitting device D2 to emit light. The first sub-data line DL1*a* may output a correspond data voltage, thereby making the first sub-light-emitting device D1 not emit light. Therefore, a capability of the display panel 1000 to separate grayscale levels is improved, and a display effect at low grayscale levels is enhanced.

Figure 2:
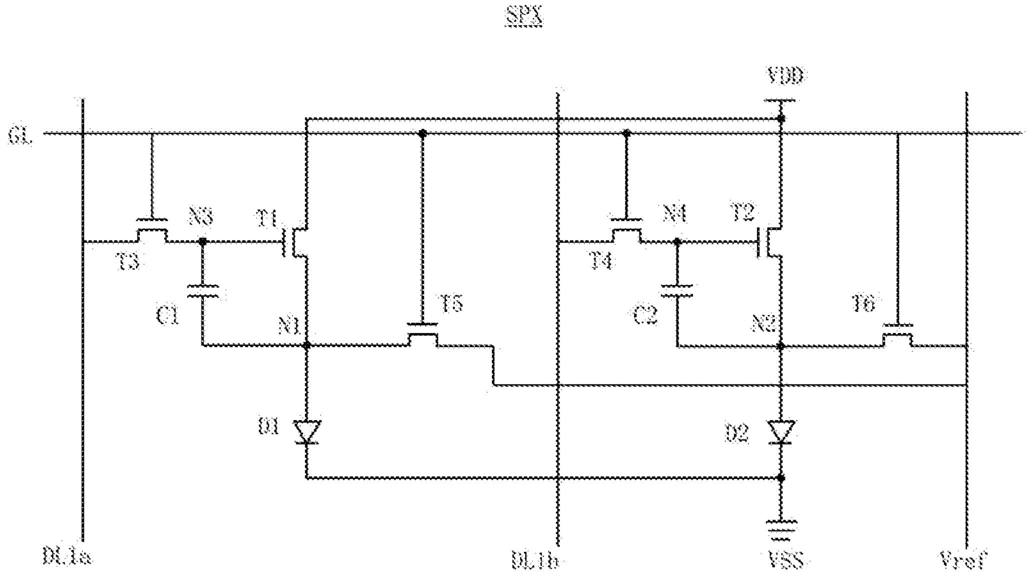
FIG. 2 is a circuit diagram of a pixel driving circuit and a light-emitting device of a display panel provided by an embodiment of the present disclosure.

Please refer to FIG. 2 again. In some embodiments, to initialize the first transistor T1, the second transistor T2, the first capacitor C1, and the second capacitor C2 when the pixel driving circuit is in an initialization state, the pixel driving circuit further includes a fifth transistor T5 and a sixth transistor T6.

A first electrode of the fifth transistor T5 is electrically connected to the second electrode of the first transistor T1 and the second electrode plate of the first capacitor C1 by the first node N1. A second electrode of the fifth transistor T5 is electrically connected to a third power line Vref (initialization power line). A gate of the fifth transistor T5 is electrically connected to the scan line GL. The third power line Vref is configured to load an initialization voltage.

A first electrode of the sixth transistor T6 is electrically connected to the second electrode of the second transistor T2 and the second electrode plate of the second capacitor C2 by the second node N2. A second electrode of the sixth transistor T6 is electrically connected to the third power line Vref (initialization power line). A gate of the sixth transistor T6 is electrically connected to the scan line GL.

The fifth transistor T5 is configured to transmit an initialization voltage of the third power line Vref in response to a scan voltage of the scan line GL, thereby initializing the first capacitor C1. The third transistor T3 is configured to transmit a first data voltage of the first sub-data line DL1*a* in response to the scan voltage of the scan line GL. The first capacitor C1 is configured storage the first data voltage. The first transistor T1 is configured to drive the first sub-light-emitting device D1 to emit light according to a driving current generated by the first data voltage. The sixth transistor T6 is configured to transmit the initialization voltage of the third power line Vref in response to the scan voltage of the scan line GL, thereby initializing the first capacitor C2. The fourth transistor T4 is configured to transmit a second data voltage of the second sub-data line DL1*b* in response to the scan voltage of the scan line GL. The second capacitor C2 is configured storage the second data voltage. The second transistor T2 is configured to drive the second sub-light-emitting device D2 to emit light according to a driving current generated by the second data voltage.

Light-emitting processes of the light-emitting device in a high/low grayscale state are described below.

When the light-emitting device is in the high grayscale display state, the third transistor T3 and the fourth transistor T4 are opened in response to a scan signal of the scan line GL, and the fifth transistor T5 and the sixth transistor T6 are closed. The first sub-data line DL1*a* loads a correspond first data voltage. The first transistor T1 is opened to drive the first sub-light-emitting device D1 to emit light. The second sub-data-line DL1*b* loads a corresponding second data voltage such as 0V, thereby making the second sub-light-emitting device D2 not emit light.

When the light-emitting device is in the low grayscale display state, the third transistor T3 and the fourth transistor T4 are opened in response to a scan signal of the scan line GL, and the fifth transistor T5 and the sixth transistor T6 are closed. The first sub-data line DL1*a* loads a correspond first data voltage such as 0V, thereby making the first sub-light-emitting device D1 not emit light. The second sub-data-line DL1*b* loads a corresponding second data voltage. The second transistor T2 is opened, thereby allowing the second sub-light-emitting device D2 to emit light.

In some embodiments, it is possible to make driving performance of the first transistor T1 surpass driving performance of the second transistor T2 in other ways. For example, a type of the first transistor T1 and a type of the second transistor T2 may be different, thereby allowing carrier mobility of the first transistor T1 to be greater than carrier mobility of the second transistor T2. The first transistor T1 may be an oxide TFT such as an indium gallium zinc oxide (IGZO) TFT. The second transistor T2 may be an amorphous silicon TFT or a single crystalline silicon TFT. capacitance of a gate oxide layer per unit area of the first transistor T1 may be greater than capacitance of a gate oxide layer per unit area of the second transistor T2. A threshold voltage of the first transistor T1 may be less than a threshold voltage of the second transistor T2.

Figure 3:
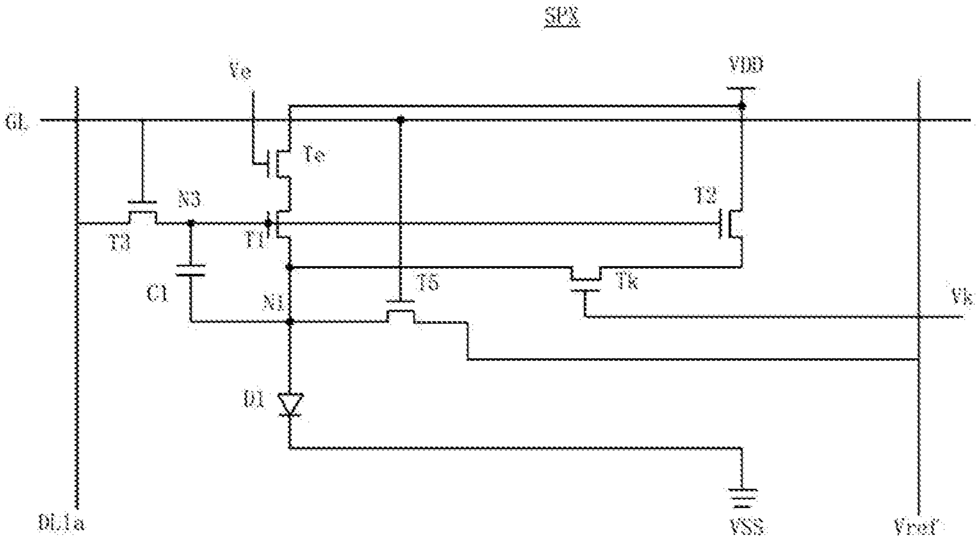
FIG. 3 is a circuit diagram of a pixel driving circuit and a light-emitting device of a display panel provided by an embodiment of the present disclosure.

Please refer to FIG. 3. In some embodiments, to simplify a structure, the second sub-light-emitting device D2, the fourth transistor T4, the sixth transistor T6, the second capacitor C2, and the second sub-data line DLb1 can be omitted. A first control TFT Te is series-connected between the first power line VDD and the first transistor T1. A gate of the first control TFT Te is connected to a first control signal line Ve. A second control TFT Tk is series-connected between the first power line VDD and a stacked transistor. A gate of the second control TFT Tk is connected to a second control signal line Vk. The gate of the second transistor T2 is electrically connected to the gate of the first transistor T1. The second electrode of the second TFT T2 is electrically connected to the second electrode of the first transistor T1. Therefore, because of the first control TFT Te and the second control TFT Tk, the first sub-light-emitting device D1 can be driven by the first transistor T1 in the high grayscale state, and can be driven by the second transistor T2 in the low grayscale display state.

An embodiment of the present disclosure further provides a display device, including the above display panel. The display device may be a stationary terminal such as a television or a computer. Alternatively, the display device may be a mobile terminal such as a smartphone or a tablet. Also, the display device may be a wearable device such as a smartwatch, a virtual reality (VR) device, or an augmented reality (AR) device.

The above embodiments of the present disclosure have been described in detail, which illustrate principles and implementations thereof. However, the description of the above embodiments is only for helping to understand the technical solution of the present disclosure and core ideas thereof, and it is understood by those skilled in the art that many changes and modifications to the described embodiments can be carried out without departing from the scope and the spirit of the disclosure that is intended to be limited only by the appended claims.

What is claimed is:

1. A display panel, comprising a pixel driving circuit and a light-emitting device, wherein the pixel driving circuit comprises:

a first transistor, wherein the first transistor and the light-emitting device are series-connected between a first power line and a second power line, and the first transistor comprises a first electrode electrically connected to the first power line, a second electrode electrically connected to the second power line, and a gate electrically connected to a data line; and a second transistor, wherein the second transistor and the light-emitting device are series-connected between the first power line and the second power line, and the second transistor comprises a first electrode electrically connected to the first power line, a second electrode electrically connected to the second power line, and a gate electrically connected to the data line;

wherein a width-to-length ratio of the first transistor is greater than a width-to-length ratio of the second transistor; the light-emitting device comprises a first sub-light-emitting device and a second sub-light-emitting device, the second electrode of the first transistor is electrically connected to the first sub-light-emitting device, and the second electrode of the second transistor is electrically connected to the second sub-light-emitting device;

the pixel driving circuit comprises a third transistor, a fourth transistor, a first capacitor, and a second capacitor, a first electrode of the third transistor is electrically connected to the data line, a second electrode of the third transistor is electrically connected to the gate of the first transistor, a gate of the third transistor is electrically connected to a scan line, a first electrode plate of the first capacitor is electrically connected to the gate of the first transistor, a second electrode plate of the first capacitor is connected to the second electrode of the first transistor, a first electrode of the fourth transistor is electrically connected to the data line, a second electrode of the fourth transistor is electrically connected to the gate of the second transistor, a gate of the fourth transistor is electrically connected to the scan line, a first electrode plate of the second capacitor is electrically connected to the gate of the second transistor, and a second electrode plate of the second capacitor is connected to the second electrode of the second transistor.

2. The display panel of claim 1, wherein the data line comprises a first sub-data line and a second sub-data line, the first electrode of the third transistor is electrically connected to the first sub-data line, and the first electrode of the fourth transistor is electrically connected to the second sub-data line.

3. The display panel of claim 2, wherein the pixel driving circuit comprises a fifth transistor and a sixth transistor, a first electrode of the fifth transistor is electrically connected to the second electrode of the first transistor and the second electrode plate of the first capacitor, a second electrode of the fifth transistor is electrically connected to a third power line, a gate of the fifth transistor is electrically connected to the scan line, a first electrode of the sixth transistor is electrically connected to the second electrode of the second transistor and the second electrode plate of the second capacitor, a second electrode of the sixth transistor is electrically connected to the third power line, and a gate of the sixth transistor is electrically connected to the scan line.

4. The display panel of claim 3, wherein when the pixel driving circuit is in a high grayscale display state, the third transistor and the fourth transistor are opened in response to a scan signal of the scan line, the fifth transistor and the sixth transistor are closed in response to the scan signal of the scan line, the first transistor is opened in response to a first data voltage of the first sub-data line, the first sub-light-emitting device emits light, the second transistor is closed in response to a second data voltage of the second sub-data line, and the second sub-light-emitting device does not emit light; and when the pixel driving circuit is in a low grayscale display state, the third transistor and the fourth transistor are opened in response to the scan signal of the scan line, the fifth transistor and the sixth transistor are closed in response to the scan signal of the scan line, the first transistor is closed in response to the first data voltage of the first sub-data line, the first sub-light-emitting device does not emit light, the second transistor is opened in response to the second data voltage of the second sub-data line, and the second sub-light-emitting device emits light.

5. The display panel of claim 1, wherein light emitted from the first sub-light-emitting device and light emitted from the second sub-light-emitting device have a same color.

6. The display panel of claim 1, wherein a ratio of the width-to-length ratio of the first transistor to the width-to-length ratio of the second transistor is greater than 1 and less than 3.

7. A display panel, comprising a plurality of sub-pixels, wherein each of the sub-pixels comprises a light-emitting device and a pixel driving circuit, and the pixel driving circuit comprises:

a first transistor, wherein the first transistor and the light-emitting device are series-connected between a first power line and a second power line, and the first transistor comprises a first electrode electrically connected to the first power line, and a second electrode electrically connected to the second power line; and a second transistor, wherein the second transistor and the light-emitting device are series-connected between the first power line and the second power line, and the second transistor comprises a first electrode electrically connected to the first power line, and a second electrode electrically connected to the second power line;

wherein driving performance of the first transistor is greater than driving performance of the second transistor; the light-emitting device comprises a first sub-light-emitting device and a second sub-light-emitting device, the second electrode of the first transistor is electrically connected to the first sub-light-emitting device, and the second electrode of the second transistor is electrically connected to the second sub-light-emitting device;

the pixel driving circuit comprises a third transistor, a fourth transistor, a first capacitor, and a second capacitor, a first electrode of the third transistor is electrically connected to the data line, a second electrode of the third transistor is electrically connected to the gate of the first transistor, a gate of the third transistor is electrically connected to a scan line, a first electrode plate of the first capacitor is electrically connected to the gate of the first transistor, a second electrode plate of the first capacitor is connected to the second electrode of the first transistor, a first electrode of the fourth transistor is electrically connected to the data line, a second electrode of the fourth transistor is electrically connected to the gate of the second transistor, a gate of the fourth transistor is electrically connected to the scan line, a first electrode plate of the second capacitor is electrically connected to the gate of the second transistor, and a second electrode plate of the second capacitor is connected to the second electrode of the second transistor;

when the sub-pixels are in a high grayscale display state, the first transistor is opened to drive the light-emitting device to emit light; and when the sub-pixels are in a low grayscale display state, the second transistor is opened to drive the light-emitting device to emit light.

8. The display panel of claim 7, wherein a width-to-length ratio of the first transistor is greater than a width-to-length ratio of the second transistor.

9. The display panel of claim 8, wherein a ratio of the width-to-length ratio of the first transistor to the width-to-length ratio of the second transistor is greater than 1 and less than 3.

10. The display panel of claim 7, wherein a carrier mobility of the first transistor is greater than a carrier mobility of the second transistor; or a capacitance of a gate oxide layer per unit area of the first transistor is greater than a capacitance of a gate oxide layer per unit area of the second transistor; or a threshold voltage of the first transistor is less than a threshold voltage of the second transistor.

11. A display device, comprising a display panel, wherein the display panel comprises a pixel driving circuit and a light-emitting device, and the pixel driving circuit comprises:

a first transistor, wherein the first transistor and the light-emitting device are series-connected between a first power line and a second power line, and the first transistor comprises a first electrode electrically connected to the first power line, a second electrode electrically connected to the second power line, and a gate electrically connected to a data line; and a second transistor, wherein the second transistor and the light-emitting device are series-connected between the first power line and the second power line, and the second transistor comprises a first electrode electrically connected to the first power line, a second electrode electrically connected to the second power line, and a gate electrically connected to the data line;

wherein a width-to-length ratio of the first transistor is greater than a width-to-length ratio of the second transistor; the light-emitting device comprises a first sub-light-emitting device and a second sub-light-emitting device, the second electrode of the first transistor is electrically connected to the first sub-light-emitting device, and the second electrode of the second transistor is electrically connected to the second sub-light-emitting device;

the pixel driving circuit comprises a third transistor, a fourth transistor, a first capacitor, and a second capacitor, a first electrode of the third transistor is electrically connected to the data line, a second electrode of the third transistor is electrically connected to the gate of the first transistor, a gate of the third transistor is electrically connected to a scan line, a first electrode plate of the first capacitor is electrically connected to the gate of the first transistor, a second electrode plate of the first capacitor is connected to the second electrode of the first transistor, a first electrode of the fourth transistor is electrically connected to the data line, a second electrode of the fourth transistor is electrically connected to the gate of the second transistor, a gate of the fourth transistor is electrically connected to the scan line, a first electrode plate of the second capacitor is electrically connected to the gate of the second transistor, and a second electrode plate of the second capacitor is connected to the second electrode of the second transistor.

12. The display device of claim 11, wherein the data line comprises a first sub-data line and a second sub-data line, the first electrode of the third transistor is electrically connected to the first sub-data line, and the first electrode of the fourth transistor is electrically connected to the second sub-data line.

13. The display device of claim 12, wherein the pixel driving circuit comprises a fifth transistor and a sixth transistor, a first electrode of the fifth transistor is electrically connected to the second electrode of the first transistor and the second electrode plate of the first capacitor, a second electrode of the fifth transistor is electrically connected to a third power line, a gate of the fifth transistor is electrically connected to the scan line, a first electrode of the sixth transistor is electrically connected to the second electrode of the second transistor and the second electrode plate of the second capacitor, a second electrode of the sixth transistor is electrically connected to the third power line, and a gate of the sixth transistor is electrically connected to the scan line.

14. The display device of claim 13, wherein when the pixel driving circuit is in a high grayscale display state, the third transistor and the fourth transistor are opened in response to a scan signal of the scan line, the fifth transistor and the sixth transistor are closed in response to the scan signal of the scan line, the first transistor is opened in response to a first data voltage of the first sub-data line, the first sub-light-emitting device emits light, the second transistor is closed in response to a second data voltage of the second sub-data line, and the second sub-light-emitting device does not emit light; and when the pixel driving circuit is in a low grayscale display state, the third transistor and the fourth transistor are opened in response to the scan signal of the scan line, the fifth transistor and the sixth transistor are closed in response to the scan signal of the scan line, the first transistor is closed in response to the first data voltage of the first sub-data line, the first sub-light-emitting device does not emit light, the second transistor is opened in response to the second data voltage of the second sub-data line, and the second sub-light-emitting device emits light.

15. The display device of claim 11, wherein light emitted from the first sub-light-emitting device and light emitted from the second sub-light-emitting device have a same color.

16. The display device of claim 11, wherein a ratio of the width-to-length ratio of the first transistor to the width-to-length ratio of the second transistor is greater than 1 and less than 3.

* * * * *